Figure 1:
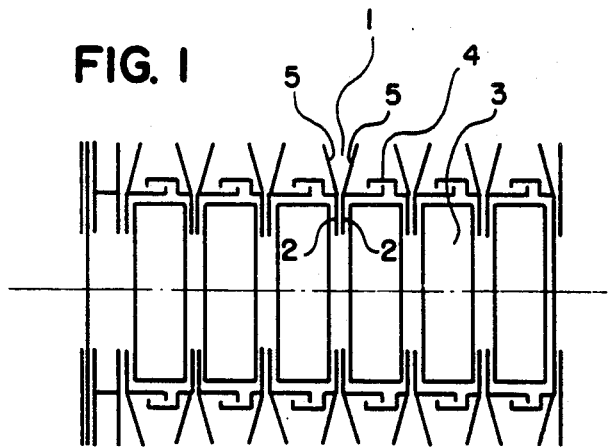

United States Patent [19]

Illmann et al.

[11] Patent Number: 4,501,413
[45] Date of Patent: * Feb. 26, 1985

[54] CLAMPING ELEMENT FOR STORAGE BATTERY PLATE STACKS

[75] Inventors: Joachim Illmann, Garbsen; Heribert Füllgraf, Suthfeld, both of Fed. Rep. of Germany

[73] Assignee: Varta Batterie Aktiengesellschaft, Hanover, Fed. Rep. of Germany

[*] Notice: The portion of the term of this patent subsequent to Aug. 3, 1999 has been disclaimed.

[21] Appl. No.: 343,500

[22] Filed: Jan. 28, 1982

Related U.S. Application Data

[62] Division of Ser. No. 42,577, May 25, 1979, Pat. No. 4,342,449.

[30] Foreign Application Priority Data

Jun. 8, 1978 [DE] Fed. Rep. of Germany ....... 2825126

[51] Int. Cl.³ .............................................. B25B 1/20
[52] U.S. Cl. ...................................... 269/43; 269/157; 269/234; 269/254 R; 269/235; 269/909
[58] Field of Search ..... 269/254 R, 254, 235, 269/238, 234, 43, 37, 157, 321 WE, 909; 339/17 M, 339/17 LM; 29/730, 239; 211/41; 24/246, 298 E, 24/252 B, 263 B, 263 CA, 255 R

[56] References Cited

U.S. PATENT DOCUMENTS

| 747,833 | 12/1903 | Alger et al. | 269/234 |
|---|---|---|---|
| 2,591,805 | 4/1952 | Gossett | 24/255 |
| 2,632,238 | 3/1953 | Dyck | 29/239 X |
| 2,956,141 | 10/1960 | Smith | 339/17 LM |
| 3,193,787 | 7/1965 | McGhee | 339/17 LM |
| 3,309,764 | 3/1967 | Klatt | 29/239 |
| 3,357,085 | 12/1967 | Martin | 29/239 |
| 4,065,116 | 12/1977 | Lindenberg et al. | 269/22 |
| 4,123,047 | 10/1978 | Koht et al. | 269/254 R |
| 4,129,093 | 12/1978 | Johnson | 269/43 |

Primary Examiner—Robert C. Watson
Attorney, Agent, or Firm—Weiser & Stapler

[57] ABSTRACT

A plate stack clamping element is formed of adjacent leaf springs preformed to diverge where they extend beyond the plate stack. Compression of the diverging portions creates large area contact clamping force against the plate stack.

11 Claims, 5 Drawing Figures

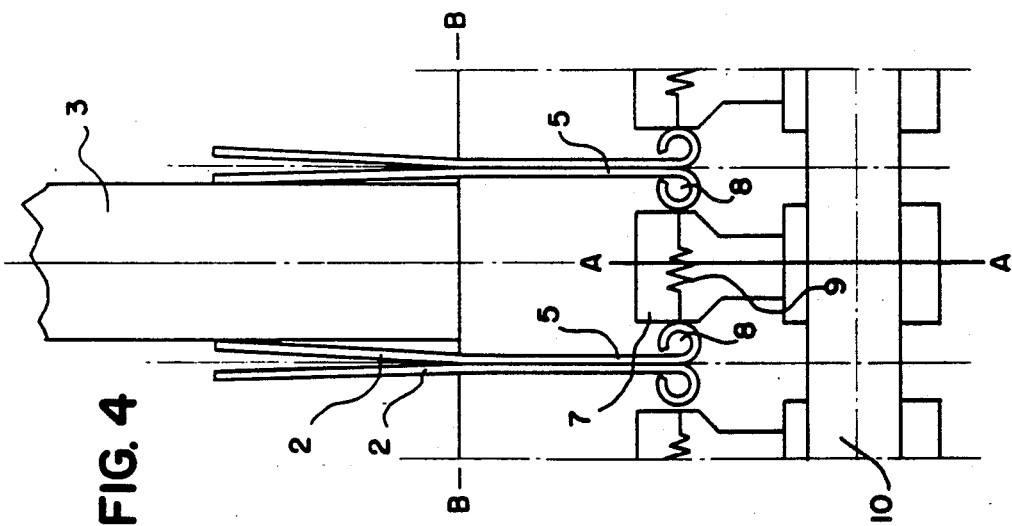
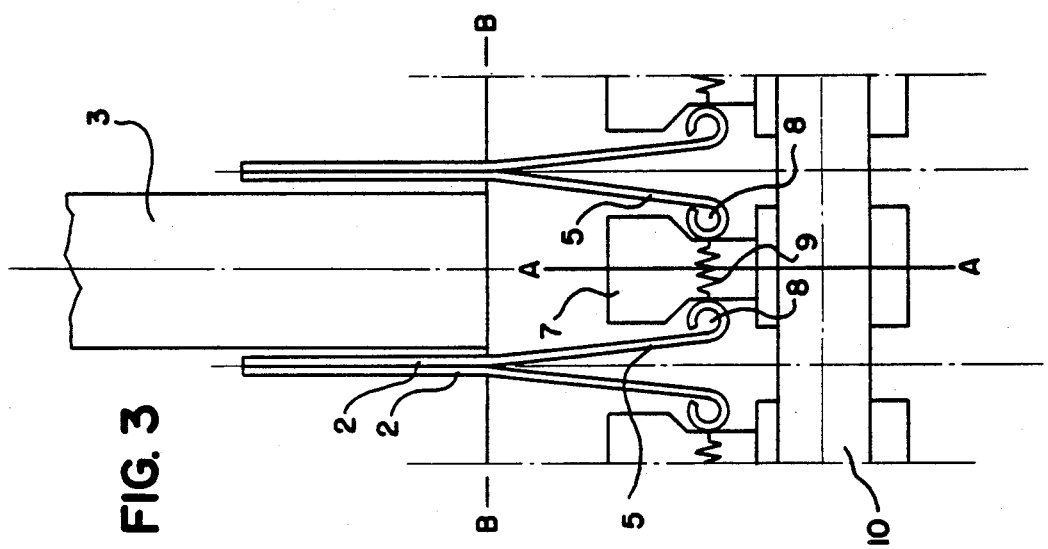

CLAMPING ELEMENT FOR STORAGE BATTERY PLATE STACKS

This is a division of application Ser. No. 042,577, filed May 25, 1979, now U.S. Pat. No. 4,342,449.

The invention relates to a clamping element for holding plate stacks of lead storage batteries and which defines a cell separating partition within a cassette conforming to the plan cross section of a block casing.

In the manufacture of batteries, it is customary to assemble six plate stacks, each of which consists when finished of positive and negative electrodes with intervening separators, united into a plate assembly while leaving narrow interstices free. This assembly is then further processed. For example, pole bridges must be cast or welded onto the plate vanes of the electrodes and these in turn must be provided with cell connectors. This presupposes that all the plate stacks are already positioned relative to each other in the same manner in which they are destined to be during subsequent final introduction into the block casing. The spaces between plate stacks must be so dimensioned that they are subsequently precisely filled by the cell separating partitions of the block casing.

There is already known apparatus for receiving and prepositioning of the plate stacks which makes possible unimpeded and careful processing of the stacks by insertion in an appropriate retainer. For example, in German Offenlegunsschrift (Patent Publication) No. 2,554,069 and U.S. Pat. No. 4,065,116 there is described an arrangement of pneumatic clamping elements which project from the sides into the interstices between the plate stacks and which are inflated by supplied compressed air in such manner that the plate stacks are firmly clamped relative to each other by the resultant compression forces.

By virtue of new injection molding techniques and appropriate synthetic plastic selection, the cell separating partitions of block casings can currently be kept so extremely thin that essentially the entire interior remains almost completely available for the reception of plate stacks.

A drawback of the known clamping element is that the possibility which is created by the thin separating partitions will not be fully exploited because each clamping element individually requires a predetermined minimum thickness for structural reasons. For pneumatic clamping elements, this is determined by the presence of inflatable membrane pockets in an open frame of the elemental plates, and by the additional juxtaposition of the actual clamping sheets to the elemental plate. This imparts to the clamping element even in its unclamped state a thickness of almost four millimeters.

Less serious drawbacks of the pneumatic clamping element reside in the danger that these can become soiled and that leaks in the pressure piping system can occur.

Accordingly, it is the primary object of the invention to provide a clamping element for holding plate stacks for further processing which makes it possible to clamp the plate stacks even with minimal interstices and which provides reliable pressure against the sides of the plate stacks even for wide thickness tolerances.

This and other objects which will appear are achieved in accordance with the invention by making the clamping elements of two closely adjacent, preformed leaf springs.

Figure 2:
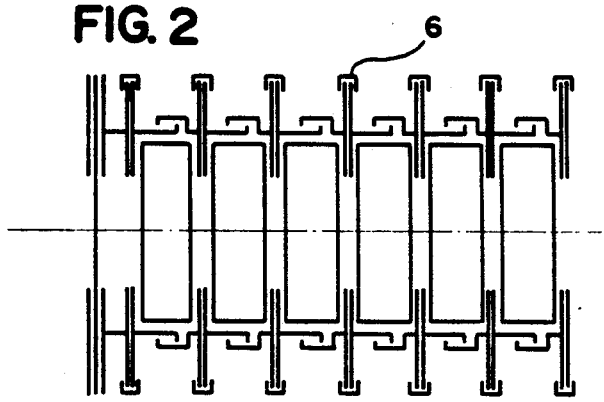
Figure 5:
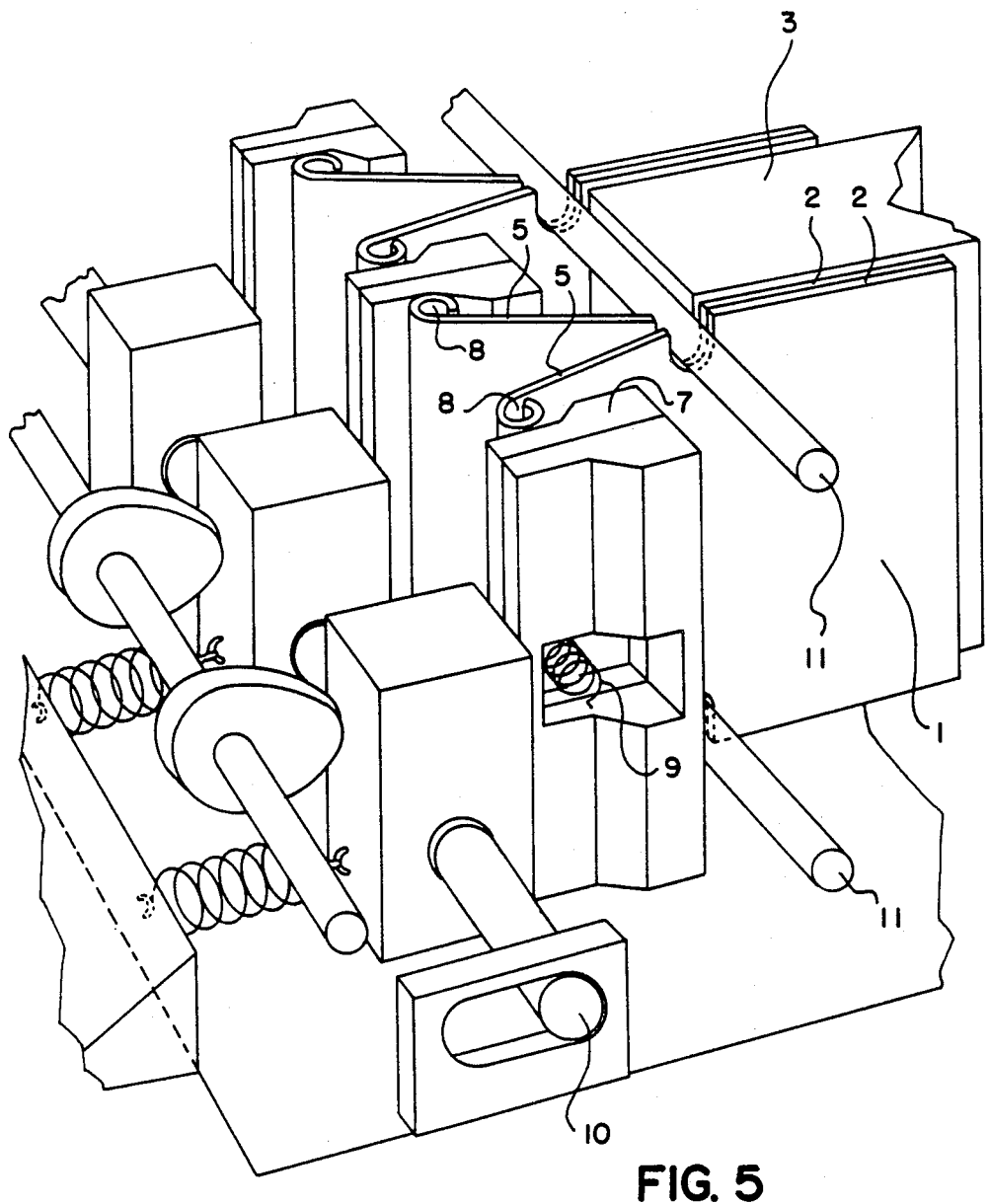

For further details, reference is made to the discussion which follows in light of the accompanying drawings wherein FIGS. 1 and 2 are diagrammatic illustrations of an embodiment of the invention in two different stages of its utilization;

FIGS. 3 and 4 are likewise diagrammatic illustrations also showing an actuating mechanism for the embodiment of FIGS. 1 and 2; and FIG. 5 is a three-dimensional representation of a portion of such an embodiment.

Referring to FIG. 1, the elements embodying the present invention are positioned within an extendable telescoping cassette. Their utilization, however, is also possible in cassettes with fixed outward configuration.

The clamping elements 1 embodying the invention which are shown in FIG. 1 in the unclamped state consist of two thin simple leaf springs 2 which have been given an angular bend through performing. The leaf springs 2 are close to but not firmly up against the sides of plate stacks 3.

The telescoping cassette has extension elements 4 which enable a telescoping of the clamping elements from left to right by a predetermined amount of play beyond the subdivision distance of the cells. However, they have no sigficance for the subject matter of this invention.

FIG. 2 shows the principle of clamping of the leaf springs 2. This takes place by squeezing together of the two spring arms 5 which project, forklike, from the regions of the cassette corresponding to the cell separating partitions, i.e. the interstices between the plate stacks 3. In so doing, the leaf springs revolve about their common contact edge at which they may be attached for example by means of a clip. Because the leaf springs have been angularly preformed, the compression of spring arms 5 automatically creates the clamped condition. This state is maintained during further processing of the block assembly by a latch 6. By unlatching there is restored the unclamped state of the clamping elements according to FIG. 1. After the cassette is pulled open in the transverse direction the finished block assembly can be lowered directly into the block casing positioned beneath it.

In accordance with the invention the leaf springs 2 have a thickness of between about 0.4 mm and 2 mm, preferably about 1 mm, and are made of spring steel. Due to the elasticity of the clamping elements there is achieved a large area contact with the plate stack 3. Such clamping elements are rugged and trouble free and inexpensive to make. However, the special advantage of the clamping element according to the invention is that the leaf springs 2, which are closely adjacent even in the clamped state, require a thickness which is no greater than that of the spring sheet material of which they are made.

FIG. 3 shows the clamping element embodying the invention corresponding to diagrammatic FIG. 1 initially in the unclamped state. For its actuation there is a slideable wedge-shaped element 7 which is positioned between the spring arms 5 of any two adjacent clamping elements 1. Good contact and good guidance of the wedge-shaped element 7 is assured by providing the ends of the spring leaves with the loops 8 and also by connecting the respective spring arms 5 with helical springs 9 through the intervening wedge-shaped element 7. The helical springs 9 simultaneously impart to the clamping elements the restoring force which is required for unclamping. The wedge-shaped elements 7 are provided with a recess for the passage of helical springs 9.

In FIG. 4 the clamping element embodying the invention is shown in the clamped state corresponding to the diagrammatic illustration of FIG. 2. The clamping is produced by sliding of the wedge-shaped elements 7 relative to loops 8 which it presses closely against each other during its movement perpendicularly to the plate block assembly. The leaf springs 2 thereby mold themselves with large area contact and firmly against plate stacks 3. The clamping element is latched in this position of the wedge-shaped elements 7 as shown in diagrammatic FIG. 2, whereas it is unlatched in the position of the wedges shown in FIG. 3.

The wedge-shaped elements 7 which are attached to a common arm 10, slide during their two and fro movement immediately above the bottom of the cassette. The movement drive can be provided, for example, as shown in FIG. 5, by means of a cam shaft in conjunction with restoring springs. A gear rack mechanism can also be used.

As is readily visible in FIG. 4, the spacing between adjacent clamping elements is determined by the thickness of wedge-shaped element 7. In order to be able to process in the same cassette plate stacks of greater thickness for other types of batteries, the spacing between the clamping elements must be increased by a corresponding amount. In the clamping element embodying the invention, this spacing increase becomes possible because the wedge-shaped element is separable along line A—A, and between its two halves a suitable spacing member of desired width can be inserted.

For holding and orienting of the clamping elements, guide rods 11 (FIG. 5) or rails are provided in the plane indicated by line B—B. If desired, the clamping elements may be displaced along these.

The actuating elements for the clamping of the leaf springs need not necessarily be positioned within the cassette but may also be placed outside it. In the latter case, the cassette can be of very simple form. This is advantageous for rapid replacement in a manufacturing plant.

We claim:

1. A clamping system for holding a plurality of plate stacks of lead storage batteries constituting separating partitions within a cassette conforming to the plan dimension of the storage battery's block casing, wherein the clamping system includes a plurality of clamping elements each having two closely adjacent preformed leaf springs, and wedge-shaped elements which are slideable between the spring portions of adjacent clamping elements to provide means for alternative clamping of the two leaf springs so that said springs are moved toward each other, and unclamping of the two leaf springs so that said springs are moved apart from each other, so as to permit insertion into the block casing and closing of the assembly.

2. The system of claim 1 wherein the leaf springs are made of a spring sheet material of a thickness of about 0.4 mm to about 2 mm, and preferably about 1 mm.

3. The system of claim 2 wherein the spring sheet material is spring steel.

4. The system of claim 1 wherein the leaf springs have portions which extend outside the cassette and are deflectable toward each other.

5. The system of claim 1 wherein wedge-shaped elements which are slideable between the spring portions of adjacent elements are provided for the clamping of the springs.

6. A clamping system for holding a plurality of plate stacks of lead storage batteries constituting separating partitions within a cassette conforming to the plan dimension of the storage battery's block casing, wherein the clamping system includes a plurality of clamping elements each having two closely adjacent preformed leaf springs, each of the two springs having a first and second portion, wherein said first portions lie flat against one another when the second portions of the springs diverge, and wherein said first portions diverge from one another when the second portions lie flat against each other, and means for alternatively moving said springs apart from and toward each other so as to permit insertion into the block casing and closing of the assembly.

7. A clamping system for holding a plurality of plate stacks of lead storage batteries constituting separating partitions within a cassette conforming to the plan dimension of the block casing, wherein the clamping system includes a plurality of clamping elements each having two closely adjacent preformed leaf springs, and wedge-shaped elements which are slideable between the spring portions of adjacent clamping elements, in order to provide alternatively clamping and unclamping of the two leaf springs of each element, said clamping elements being coupled together to move as a group.

8. In a cassette conforming to a plan cross section of a block casing of lead storage batteries having a clamping system for holding a plurality of plate stacks of lead storage batteries constituting separating partitions, the improvement which comprises, said clamping system including a plurality of clamping elements each having two closely adjacent preformed leaf springs, and wedge-shaped elements which are slideable between the spring portions of adjacent clamping elements in order to provide alternatively clamping and unclamping of the two leaf springs of each element.

9. The cassette of claim 8 wherein wedge-shaped elements which are slideable between the spring portions of adjacent elements are provided for the clamping of the springs.

10. In a cassette conforming to a plan cross section of a block casing of lead storage batteries having a clamping system for holding a plurality of plate stacks, the improvement which comprises, said clamping system including a plurality of clamping elements each having two closely adjacent preformed leaf springs, each of the two springs having one portion which lies flat against the adjacent portion of the other spring when the remaining portions of the two springs diverge, and which diverges from the adjacent portion of the other spring when the remaining portions lie flat against each other.

11. The cassette of claim 10 wherein the clamping elements are coupled together to move as a group.

* * * * *